United States Patent
Huhn et al.

[11] Patent Number: 5,302,657
[45] Date of Patent: Apr. 12, 1994

[54] HIGHLY DISPERSED ORGANOPOLYSILOXANE EMULSIONS

[75] Inventors: Karl Huhn; Christine Seidl; Kurt Ullrich, all of Burghausen, Fed. Rep. of Germany

[73] Assignee: Wacker-Chemie GmbH, Munich, Fed. Rep. of Germany

[21] Appl. No.: 891,901

[22] Filed: Jun. 1, 1992

Related U.S. Application Data

[63] Continuation of Ser. No. 661,479, Feb. 14, 1991, abandoned.

[30] Foreign Application Priority Data

Feb. 16, 1990 [DE] Fed. Rep. of Germany ....... 4004946

[51] Int. Cl.$^5$ ................................. C08L 83/00
[52] U.S. Cl. ................................. 524/588; 428/391; 252/8.8; 252/312; 252/8.6; 106/287.11
[58] Field of Search ............. 252/8.8, 312, 8.6; 106/287.11; 524/588; 428/391

[56] References Cited

U.S. PATENT DOCUMENTS

| | | | |
|---|---|---|---|
| 4,248,751 | 2/1981 | Willing | 260/292 M |
| 4,388,437 | 6/1983 | Ona | 524/588 |
| 4,399,247 | 8/1983 | Ona et al. | 524/204 |
| 4,436,856 | 3/1984 | Huhn et al. | 106/287.11 |
| 4,501,619 | 2/1985 | Gee | 524/588 |
| 4,509,981 | 4/1985 | Sanders, Jr. et al. | 106/287.11 |
| 4,559,385 | 12/1985 | Huhn et al. | 524/838 |
| 4,814,376 | 3/1989 | Tanaka et al. | 524/588 |
| 4,928,561 | 12/1990 | Cray et al. | 252/8.8 |
| 4,978,363 | 12/1990 | Ona et al. | 252/8.6 |
| 5,000,861 | 3/1991 | Yang | 252/8.6 |
| 5,017,297 | 5/1991 | Spyropoulos et al. | 252/8.6 |
| 5,037,878 | 8/1991 | Cerles et al. | 524/588 |
| 5,057,572 | 10/1991 | Chrobaczek et al. | 528/588 |

FOREIGN PATENT DOCUMENTS

| | | |
|---|---|---|
| 79029 | 7/1982 | Australia . |
| 0156970 | 10/1985 | European Pat. Off. . |
| 1240278 | 5/1967 | Fed. Rep. of Germany . |
| 3031157 | 3/1981 | Fed. Rep. of Germany . |
| 3139974 | 5/1982 | Fed. Rep. of Germany . |
| 3723697 | 11/1988 | Fed. Rep. of Germany . |
| 3842471 | 6/1989 | Fed. Rep. of Germany . |
| 1191289 | 5/1970 | United Kingdom . |
| 2085903 | 5/1982 | United Kingdom . |
| 2215729 | 9/1989 | United Kingdom . |

*Primary Examiner*—Melvyn I. Marquis
*Assistant Examiner*—Karen A. Dean

[57] ABSTRACT

The invention relates to a process for preparing polyorganosiloxane-containing emulsions having a mean particle size of less than 0.3 μm in which, in a first step, (A) a concentrate is prepared by mixing a polyorganosiloxane with water and an emulsifier which is soluble in the polyorganosiloxane.

and, in a second step, (B) the concentrate thus obtained is diluted with water to the desired polyorganosiloxane concentration.

These emulsions can be used for impregnating fibres and fabrics.

10 Claims, No Drawings

HIGHLY DISPERSED ORGANOPOLYSILOXANE EMULSIONS

This application is a continuation of application Ser. No. 07/661,479, filed Feb. 14, 1991, now abandoned.

The present invention relates to highly dispersed organopolysiloxane-containing emulsions and to a process for preparing highly dispersed organopolysiloxane-containing emulsions.

BACKGROUND OF THE INVENTION

Highly dispersed organopolysiloxane emulsions are disclosed, inter alia, in U.S. Pat. No. 4,620,878 (published on Nov. 4, 1986, R. P. Gee, Dow Corning Corp.). The emulsions prepared in accordance with this patent must contain at least one emulsifier which is insoluble in the organopolysiloxane. In a first step, an organopolysiloxane, an emulsifier and water are used to form an oil concentrate, which, in a second step, must be dispersed in water very rapidly and without any delay to give a sufficiently dispersed emulsion. Highly dispersed emulsions are also described in WO 88/08 436 (laid-open on Nov. 3, 1988, H. Chrobaczek et al., Chemische Fabrik Pfersee GmbH). These emulsions are prepared from an aminoalkyl-substituted polyorganosiloxane, a water-soluble emulsifier, acid and water while heating to at least 50° C.

It is an object of the present invention to provide a process for preparing highly dispersed emulsions. Another object of the present invention is to provide a process for preparing such emulsions in which the concentrate obtained as an intermediate need not be rapidly and immediately dispersed in water. A further object of the present invention is to provide a process for preparing emulsions in which the reaction mixture need not be kept at a relatively high temperature during the preparation of the emulsions.

SUMMARY OF THE INVENTION

The foregoing objects and others which will become apparent from the following description are accomplished in accordance with this invention, generally speaking by providing a process for preparing organopolysiloxane-containing emulsions having a mean particle size of less than 0.3 μm, which comprises in a first step, (A) forming a concentrate by mixing an organopolysiloxane with water and an emulsifier which is soluble in the organopolysiloxane, and, in a second step, (B) diluting the resultant concentrate with water to the desired organopolysiloxane concentration.

DESCRIPTION OF THE INVENTION

In the process described above, steps (A) or (B) and more preferably steps (A) and (B), are carried out at temperatures below 50° C., and more preferably below 40° C.

The organopolysiloxanes which are converted into a highly dispersed emulsion in the process of this invention contain, in particular, at least one ammonium-functional organopolysiloxane. At least 50 percent by weight, and in particular at least 75 percent by weight, of the organopolysiloxane preferably contain amino- and/or ammonium-functional organopolysiloxanes.

The emulsions prepared by the process of this invention preferably have a mean particle size of less than 0.14 μm. These emulsions are transparent and generally clear.

In the process of this invention, organopolysiloxanes of formula (I) are preferably employed:

$$R_n R'_m SiO_{(4-n-m)/2} \qquad (I)$$

in which R represents the same or different hydrocarbon radicals having from 1 to 18 carbon atoms, substituted hydrocarbon radicals having from 1 to 18 carbon atoms, hydrocarbonoxy radicals having from 1 to 18 carbon atoms or substituted hydrocarbonoxy radicals having from 1 to 18 carbon atoms, R' represents the same or different, Si-C-bonded substituted hydrocarbon radicals containing polar groups or hydroxyl groups, n is an integer having a value of 0, 1, 2 or 3, and m is an integer having a value of 0, 1, 2 or 3, and the sum of n+m has an average value of from 1.8 to 2.2, and m has a value such that the organopolysiloxane contains at least one radical R'.

Although this is not shown in the above formula, some of the radicals R may be replaced by hydrogen atoms bonded directly to silicon atoms; however, this is not preferred.

The sum n+m preferably has an average value of from 1.9 to 2.1.

R' is preferably an aminoalkyl or ammonium-alkyl radical.

Examples of hydrocarbon radicals represented by R are alkyl radicals, such as methyl, ethyl, n-propyl, isopropyl, n-butyl, isobutyl, tert-butyl, n-pentyl, isopentyl, neopentyl and tert-pentyl radicals, hexyl radicals, such as the n-hexyl radical, heptyl radicals, such as the n-heptyl radical, octyl radicals, such as the n-octyl radical, and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; alkenyl radicals, such as the vinyl and allyl radicals; cycloalkyl radicals, such as cyclopentyl, cyclohexyl and cycloheptyl radicals, and methylcyclohexyl radicals; aryl radicals, such as the phenyl, naphthyl and anthryl and phenanthryl radicals; alkaryl radicals, such as o-, m- and p-tolyl radicals, xylyl radicals and ethylphenyl radicals, aralkyl radicals, such as the benzyl radical and the alpha- and β-phenylethyl radicals.

Examples of substituted hydrocarbon radicals represented by R are cyanoalkyl radicals, such as the β-cyanoethyl radical, and halogenated hydrocarbon radicals, for example haloalkyl radicals, such as the 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radical.

Examples of hydrocarbonoxy and substituted hydrocarbonoxy radicals represented by R are substituted and unsubstituted hydrocarbon radicals R, mentioned in the above examples which are bonded via an oxygen atom to a silicon atom, and in particular alkoxy radicals having from 1 to 18 carbon atoms and phenoxy radicals, and more preferably the methoxy, ethoxy, n-propoxy, isopropoxy and phenoxy radicals. Preferably, at most 5 percent of the radicals R are optionally substituted hydrocarbonoxy radicals.

Examples of radicals R' are amino-functional hydrocarbon radicals, for example aminoalkyl radicals, such as the γ-aminopropyl radical and the β-aminoethyl-γ- aminopropyl radical; aminoaryl radicals; Si-C-bonded cyclic amino-functional radicals; ammonium-alkyl radicals, such as the radicals which can be formed from the above mentioned amino-functional hydrocarbon radicals by reaction with carboxylic or mineral acids or alkylating agents; hydroxyl groups, or carboxylic acid or sulphonic acid radicals which are bonded to the silicon atom via an alkylene or arylene group, or esters thereof; mercaptoalkyl radicals; and Si-C-bonded hydrocarbon radicals which contain epoxy, hydroxyl, amido and/or carboxyl groups, Examples of preferred radicals represented by R' are amino-functional hydrocarbon radicals, for example aminoalkyl radical, such as the aminomethyl, 1- or 2-aminoethyl, 1-, 2- or 3-aminopropyl, 4-aminobutyl, N,N-dimethylaminomethyl and N-(2-aminoethyl)-3-aminopropyl radicals; aminoaryl radicals, such as o-, m, and p-aminophenyl radicals or o-, m- and p-(N,N-dimethylamino)-phenyl radicals; morpholine and piperidine radicals which are bonded to the silicon atom either directly or via an alkylene group; ammonium-functional hydrocarbon radicals which are obtained from the reaction of the amino-functional hydrocarbon radicals mentioned above with mineral acids, such as hydrochloric, perchloric, sulphuric, sulphurous, nitric, nitrous, hydrofluoric, phosphoric, diphosphoric and polyphosphoric acids; with carboxylic acids, such as formic, acetic, propionic and butanoic acids, citric acid, trichloro-, dichloro- and chloroacetic acid, trifluoroacetic acid, cyanoacetic acid, phenylacetic acid, benzoic acid, m- and p-nitrobenzoic acid, oxalic acid, malonic acid, lactic acid and the like.

Examples of amido-functional radicals are the γ-acetamidopropyl radical, and partially or fully acetylated β-aminoethyl-γ-aminopropyl radicals, Particularly preferred radicals represented by R' are the 3-aminopropyl radical, the N-(2-aminoethyl)-3-aminopropyl radical, and ammonium-functional radicals which can be prepared therefrom by reaction with the mineral and/or carboxylic acids mentioned above, and in particular with acetic acid.

The radicals R are preferably methyl, ethyl, phenyl, methoxy and/or vinyl radicals. Due to their availability, 50 percent of the radicals represented by R, and more preferably at least 80 percent of the radicals R, are preferably methyl radicals.

It is possible to employ one polyorganosiloxane, preferably one of formula (I), or more than one polyorganosiloxane. If more than one polyorganosiloxane is employed, it is preferred that at least one polyorganosiloxane of formula (I) be employed. Specifically, it is possible to employ at least one polyorganosiloxane of formula (I) mixed with polydimethylsiloxanes containing terminal alkyl and/or alkoxy groups, each having from 1 to 4 carbon atoms, or only poly-organosiloxanes of formula (I). However, it is particularly preferred that only polyorganosiloxanes of formula (I) be employed, and more preferably one polyorganosiloxane of formula (I).

The polyorganosiloxane (mixture) employed in the process of this invention is preferably liquid. In particular, the polyorganosiloxanes employed in the process of this invention each have viscosities of from 100 mPa.s to 1,000,000 mPa.s, in each case measured at 25° C.

In the preparation of the emulsions of this invention, emulsifiers are required which are soluble in the polyorganosiloxane. This means that the emulsifier employed in each case or the emulsifier mixture employed in each case must be soluble in the polyorganosiloxane. If an emulsifier mixture is employed, each emulsifier present therein is preferably soluble in the polyorganosiloxane. The solubility of an emulsifier or of an emulsifier mixture is preferably determined by mixing one part by weight of emulsifier or emulsifier mixture with one hundred parts by weight of polyorganosiloxane at 20° C. If the resultant mixture is clear, the emulsifier or emulsifier mixture is regarded as being soluble in the polyorganosiloxane.

Examples of emulsifiers which may be employed in this invention include, in particular: Anionic emulsifiers:

1. Alkyl sulphates, particularly those having a chain length of from 8 to 18 carbon atoms, alkyl and alkyl ether sulphates having from 8 to 18 carbon atoms in the hydrophobic radical and from 1 to 40 ethylene oxide (EO) or propylene oxide (PO) units.
2. Sulphonates, in particular alkylsulphonates having from 8 to 18 carbon atoms, alkylarylsulphonates having from 8 to 18 carbon atoms, taurides, esters and monoesters of sulphosuccinic acid with monohydric alcohols or alkylphenols having from 4 to 15 carbon atoms; if desired, these alcohols or alkylphenols may also be ethoxylated with from 1 to 40 EO units.
3. Alkali metal and ammonium salts of carboxylic acids having from 8 to 20 carbon atoms in the alkyl, aryl, alkaryl or aralkyl radical.
4. Partial esters of phosphoric acid, and alkali metal and ammonium salts thereof, in particular alkyl and alkaryl phosphates having from 8 to 20 carbon atoms in the organic radical, alkyl ether phosphates and alkaryl ether phosphates having from 8 to 20 carbon atoms in the alkyl or alkaryl radical and from 1 to 40 EO units.

Nonionic emulsifiers:

5. Alkyl polyglycol ethers, preferably those having from 2 to 40 EO units and alkyl radicals having from 8 to 20 carbon atoms.
6. Alkaryl polyglycol ethers, preferably those having from 2 to 40 EO units and from 8 to 20 carbon atoms in the alkyl and aryl radicals.
7. Ethylene oxide/propylene oxide (EO/PO) block copolymers, preferably those having from 8 to 40 EO or PO units.
8. Fatty acid polyglycol esters, preferably those having from 6 to 24 carbon atoms and from 2 to 40 EO units.
9. Natural products and derivatives thereof, such as lecithin, lanolin, saponins, cellulose; cellulose alkyl ethers and carboxyalkylcelluloses whose alkyl groups each have up to 4 carbon atoms.
10. Linear organopolysiloxane-containing polar groups, in particular those containing alkoxy groups having up to 24 carbon atoms and/or up to 40 EO and/or PO groups.

Cationic emulsifiers:

11. Salts of primary, secondary and tertiary fatty amines having from 8 to 24 carbon atoms with acetic acid, sulphuric acid, hydrochloric acid and phosphoric acids.
12. Quaternary alkyl- and alkylbenzeneammonium salts, in particular those whose alkyl group has from 6 to 24 carbon atoms, preferably the halides, sulphates, phosphates and acetates.
13. Alkylpyridinium, alkylimidazolinium and alkyloxazolinium salts, in particular those whose alkyl chain has up to 18 carbon atoms, specifically the halides, sulphates, phosphates and acetates.

All these emulsifiers can be employed in the process of this invention as long as they are soluble in the polyorganosiloxane.

Preferred emulsifiers, which are soluble in the polyorganosiloxane, are nonionic emulsifiers, in particular the nonionic emulsifiers listed above under 5. and 6., preferably the alkyl polyglycol ethers listed under 5., and more preferably alkyl polyglycol ethers having from 2 to 10 EO units and alkyl radicals of from 8 to 20 carbon atoms.

The emulsions which can be prepared by the process of this invention preferably contain from 5 to 50 percent by weight, and more preferably from 10 to 25 percent by weight, of polyorganosiloxane, based on the sum of the weights of the polyorganosiloxane, the emulsifier and water. The emulsions which can be prepared by the process of this invention preferably contain the emulsifier in amounts of from 10 to 70 percent by weight, and more preferably from 20 to 40 percent by weight, based on the weight of the polyorganosiloxane employed.

In addition to the polyorganosiloxane, the emulsifier and water, the emulsions of this invention may also contain additives. These are, in particular, bactericides, fungicides, algicides, microbicides, fragrances, corrosion inhibitors, dyes, pigments, thickeners, fillers and, although not preferred, organic solvents. The emulsions which can be prepared in accordance with this invention preferably contain additives in amounts of from 0 to 1 percent by weight, and more preferably from 0.01 to 0.1 percent by weight, based on the sum of the weights of the polyorganosiloxane, the emulsifier and water.

In step (A) of the process of this invention, a concentrate is prepared from the polyorganosiloxane, the emulsifier which is soluble in the polyorganosiloxane, and water. In principle, these components can be added in any desired sequence, but it is preferred to first prepare a organosiloxane to this mixture. The amount of water added in step (A) is preferably from 5 to 100 parts by weight, and more preferably from 10 to 40 parts by weight, based on 100 parts by weight of the polyorganosiloxane.

The addition of the remaining water in step (B) of the process of this invention is preferably effected by stepwise incorporation into the concentrate.

Warming of the mixture is not necessary either in step (A) or in step (B). The temperature in at least step (A) or step (B), or in both steps, is preferably from 5° C. to 45° C., and more preferably from 10° C. to 40° C.

The pressure exerted on the respective components or mixtures in step (A) is preferably the external pressure, if desired increased by mixing elements, of from 0.01 to 1 MPa (abs.), and more preferably from 0.09 to 0.11 MPa (abs.)

The ammonium-functional polyorganosiloxane preferably present in the emulsions of this invention and employed in the process of this invention can be prepared by adding mineral acids or carboxylic acids to appropriate amino-functional polyorganosiloxanes. It is preferred that the acid be added to the polyorganosiloxane before the polyorganosiloxane is employed in step (A) of the process of this invention. However, the reaction of the amino-functional polyorganosiloxanes may alternatively be carried out during step (A) by employing an appropriate amount of acid and amino-functional polyorganosiloxane in step (A). In both cases, it is preferred that the amount of acid be such that not all the amino groups of the amino-functional polyorganosiloxane be converted into ammonium groups.

If an amino-functional polyorganosiloxane is used to prepare the ammonium-functional siloxane preferably employed in the process of this invention, it is preferred that it has an amine number of from 0.1 to 3.0 and more preferably from 0.2 to 0.9. The amine number of an amino-functional substance is determined by the consumption in $cm^3$ of N hydrochloric acid on titration of 1 g of the amino-functional substance.

If an amino-functional polyorganosiloxane is used, the emulsion is preferably adjusted to a pH of from 3 to 7, and more preferably from 4 to 6, after step (B) by the addition of an acid.

The pressure exerted on the concentrate during its dilution with water in step (B) is preferably the external pressure, if desired increased by mixing elements, of from 0.01 to 1 MPa (abs.), and more preferably from 0.09 to 0.11 MPa (abs.).

The process of this invention may be carried out in any turbulent mixer which has been used heretofore or could have been used heretofore in the preparation of emulsions. As described heretofore, the mixer need not be capable of being heated.

Examples of mixers which can be used in step (A) and step (B) are stirrers, such as paddle, straight-arm paddle, anchor, gate, screw, propeller, disc, impeller, turbine and planetary stirrers, single- and twin-screw mixers, mixing turbines, colloid mills, ultrasound mixers, in-line mixers, pumps, and homogenizers, such as high-pressure, turbine and circulating homogenizers.

The process of this invention can be carried out batchwise, continuously or semicontinuously. The process is preferably carried out continuously.

The emulsions of this invention may be employed in all cases where silicone emulsions have been employed heretofore. They are particularly suitable for impregnating fibres and fabrics, in detergents and polishes, in paints or as impregnants for building materials and precursors thereof, in anti-foam agents and for coatings which repel tacky substances. Thus, they can be used for sizing glass, ceramic and carbon fibres, for impregnating and coating textile fibres such as, for example as filament lubricants and textile fabrics, in cosmetics, such as hand creams, body lotions, shampoos, hair rinses, hair setting lotions, shaving creams and lotions, in polishes, such as furniture, floor and car polishes, in waxes, such as floor waxes, and in disinfectants, for waterproofing gypsum before or after shaping to form building components, for impregnating natural or synthetic rock, concrete, cement or brick work, for waterproofing aerated concrete before or after foaming, in building paints and parts thereof, such as emulsion paints, in particular in silicone paints, in or as paper coatings for backings for self-adhesive labels, and as mould-release agents for polymers.

A particularly preferred use of the emulsions of this invention is as agents or in agents for impregnating and coating textile fibres and fabrics.

In the following examples, unless otherwise specified,
(a) all amounts are by weight;
(b) all pressures are 0.10 MPa (abs.) and
(c) all temperatures are 20° C.

EXAMPLES

Amino-functional polyorganosiloxanes:

Polymer A: Polydiorganosiloxane comprising dimethylsiloxy, methyl(β-aminoethyl-γ-aminopropyl)-siloxy units and terminal trimethylsilyl groups; viscosity: 1,000 mPa.s at 25° C.; amine number: 0.6.

Polymer B: Polydiorganosiloxane comprising dimethylsiloxy, methyl(β-aminoethyl-γ-aminopropyl)-siloxy units and terminal methoxydimethylsilyl groups; viscosity: 1,000 mPa.s at 25° C.; amine number: 0.3.

Emulsifier C: Isotridecyl alcohol polyglycol ether having 6 ethyleneoxy units, commercially available under the tradename Genapol® X060 from Hoechst AG, D-6000 Frankfurt/Main 80.

EXAMPLE 1

(a) An ammonium-functional polyorganosiloxane was prepared by mixing 170 parts by weight of polymer A with 3 parts of weight of 99.8 percent by weight of acetic acid. The emulsifier C is soluble in the resultant polymer.

(b) A concentrate was prepared by emulsifying 173 parts by weight of the polymer prepared in (a) above, 60 parts by weight of emulsifier C and 50 percent by weight of water.

(c) The concentrate prepared in (b) above was diluted in steps with 717 parts by weight of water. A water-clear emulsion having an average particle diameter of 4 nm was obtained.

The maximum temperature achieved during the procedure described in Example 1 was 33° C.

EXAMPLE 2

(a) An ammonium-functional polyorganosiloxane was prepared by mixing 170 parts by weight of polymer B with 3 parts by weight of 99.8 percent by weight of acetic acid. The emulsifier C is soluble in the resultant polymer.

(b) A concentrate was prepared by emulsifying 173 parts by weight of the polymer prepared in (a) above, 60 parts by weight of emulsifier C and 50 percent by weight of water.

(c) The concentrate prepared in (b) above was diluted in steps with 717 parts by weight of water. A water-clear emulsion having an average particle diameter of 16 nm was obtained.

The maximum temperature achieved during the procedure described in Example 2 was 33° C.

EXAMPLE 3

About 170 parts by weight of polymer A, 70 parts by weight of water and 3 parts by weight of 99.8 percent by weight of acetic acid were incorporated into a mixture containing 60 parts by weight of emulsifier C and 60 parts by weight of water. (Emulsifier C is soluble in the ammonium-functional polyorganosiloxane prepared from 170 parts by weight of polymer A and 3 parts by weight of 99.8 percent by weight acetic acid.)

The resultant pasty mixture was diluted very slowly and, as soon as the viscosity of the mixture had decreased, the water was added rapidly until a total of 637 parts by weight of water had been added, and then 0.5 parts by weight of a bactericidal, algicidal and corrosion-inhibiting additive were added. The pH of the resultant emulsion was subsequently adjusted to a value of 5.5 using dilute acetic acid.

A water-clear emulsion having an average particle diameter of 25 nm was obtained.

The maximum temperature achieved during the procedure described in Example 3 was 30° C.

EXAMPLES 4 to 6

Examples 1, 2 and 3 were repeated in a continuous process, in which the concentrate prepared in a first mixer was diluted in a second mixer and further diluted in a second mixer with the appropriate amount of water and, if desired, an additive was added. In each case, water-clear emulsions having an average particle diameter of less than 100 nm were obtained. The maximum temperature achieved in each of these examples was 30° C.

What is claimed is:

1. A process for preparing clear and/or transparent polyorganosiloxane-containing emulsions having a mean particle size of less than 0.3 μm, which comprises, in a first step, (A) preparing a concentrate by mixing a mixture of polyorganosiloxanes having at least one polyorganosiloxane of the formula $$R_nR'_mSiO_{(4-n-m)/2} \tag{I}$$

in which R is selected from the group consisting of hydrocarbon radicals having from 1 to 18 carbon atoms, halogenated hydrocarbon radicals and cyanoalkyl radicals having from 1 to 18 carbon atoms, hydrocarbonoxy radicals having from 1 to 18 carbon atoms and hydrocarbonoxy radicals in which the hydrocarbon radicals are halogenated monovalent hydrocarbon radicals or cyanoalkyl radicals, R' is selected from the group consisting of hydroxyl groups, Si-C-bonded aminofunctional hydrocarbon radicals, ammonium alkyl radicals, SiC-bonded hydrocarbon radicals which contain epoxy, hydroxyl, amido, carboxyl or sulfonic acid radicals and esters thereof and SiC-bonded mercaptoalkyl radicals, n is an integer having a value ob 0, 1, 2 or 3, and m is an integer having a value of 0, 1, 2 or 3, and the sum of n+m has an average value of from 1.8 to 2.2, with the proviso that m has a value such that at least one R' radical is present in the polyorganosiloxane and that at least 50% by weight of the polyorganosiloxanes are of formula (I), in which R' is an ammonium alkyl radical, with sufficient water and an emulsifier which is soluble in the polyorganosiloxane mixture to form a concentrate, in which the emulsifier is regarded as being soluble in the polyorganosiloxane mixture if the mixture of one part by weight of emulsifier with one hundred parts by weight of polyorganosiloxane mixture is clear at 20° C., and in a second step, (B) diluting the resultant concentrate with water to the desired polyorganosiloxane concentration.

2. A clear and/or transparent polyorganosiloxane emulsion prepared in accordance with the process of claim 1, in which the polyorganosiloxane consists solely of the polyorganosiloxane of formula (I), in which R' is an ammonium alkyl radical.

3. The process of claim 1, in which at least one of steps (A) or (B), is carried out at a temperature of from 5° to below 50° C.

4. The process of claim 1, in which steps (A) and (B) are carried out at a temperature of from 5° to below 50° C.

5. The process of claim 1, in which the polyorganosiloxane consists solely of a polyorganosiloxane of formula I, in which R' is an ammonium alkyl radical.

6. The process of claim 1, in which, in step (A) the polyorganosiloxane is added to a mixture containing the emulsifier and water.

7. A polyorganosiloxane-containing emulsion prepared in accordance with the process of claim 1.

8. A process for treating fibres and fabrics which comprises impregnating fibres and fabrics with the emulsion of claim 7.

9. Fibres and fabrics impregnated with the emulsions prepared in accordance with the process of claim 1.

10. Building materials which have been treated with the emulsions prepared in accordance with the process of claim 1.

* * * * *